D. BULL.
Horse Hay Rake.
No. 92,156.
Patented July 6, 1869.
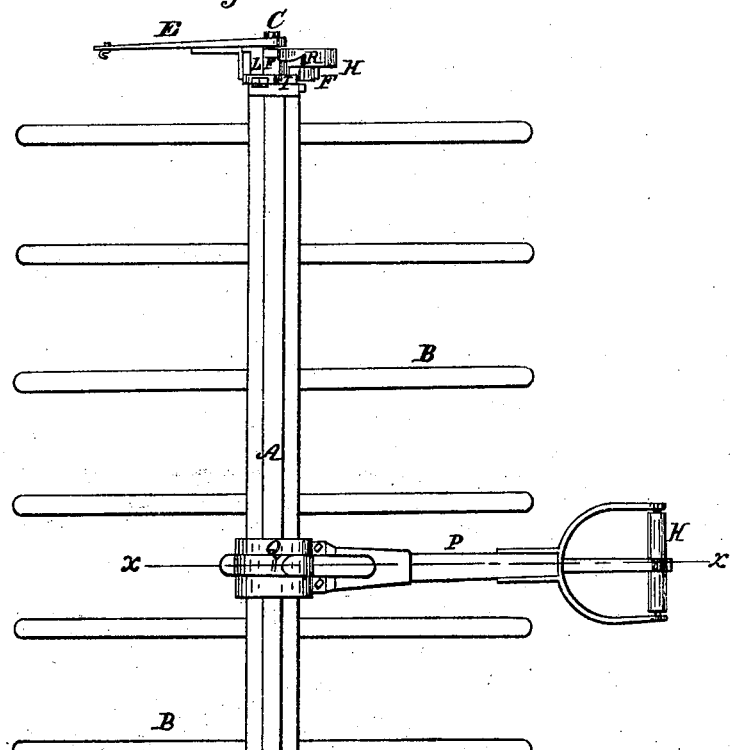
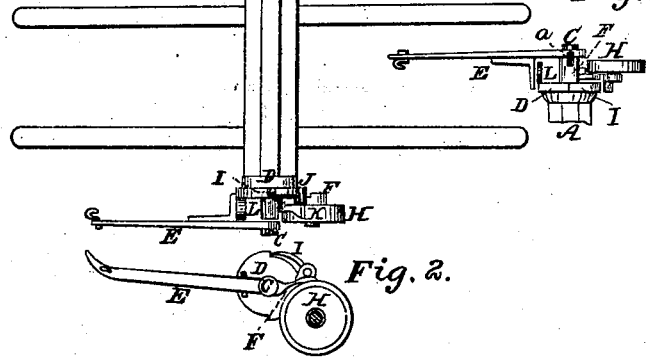
Witnesses:
J. L. Coburn
Henri Bruns
Inventor:
Daniel Bull
Per Lewis L. Coburn
Atty.

United States Patent Office.

DANIEL BULL, OF AMBOY, ILLINOIS.

Letters Patent No. 92,156, dated July 6, 1869.

---

IMPROVEMENT IN HORSE-RAKES.

---

The Schedule referred to in these Letters Patent and making part of the same.

---

*To all whom it may concern:*

Be it known that I, DANIEL BULL, of Amboy, in the county of Lee, and State of Illinois, have invented a new and useful Improvement in Horse-Rakes; and I do hereby declare the following to be a full, clear, and exact description of the same, reference being had to the accompanying drawings, and the letters and figures marked thereon, which form a part of this specification, and in which—

Figure 1 represents a top or plan view of my improved rake;

Figure 2, an end view without the teeth or handle; and

Figure 3, a vertical sectional view through the handle, at the line $x$ in fig. 1; and Figure 4, a bottom view of one end of the rake.

The nature of my invention consists in a novel mechanism for attaching the small wheels or rollers, and the draught-arms to the end of the rake-head, and also in the novel mechanism for attaching and operating the rake-handle, so as to control the rake, as hereafter more fully described.

To enable those skilled in the art to understand how to manufacture and use my invention, I will proceed to describe the same with particularity.

The same letters of reference refer to the corresponding parts in the different figures.

I make an ordinary rake-head, A, with teeth B, such as are ordinarily used in revolving wooden-teeth rakes.

At each end of the rake-head there is a spindle, C, and a metallic piece or head, D, rigidly attached to the rake.

The draught-arms or rods E, and wheel or roller-supports F, are hung on the spindle C, in such a way as to turn thereon when the rake-head revolves, as hereafter described.

There are spindles attached to the pieces F, on which the wheels H revolve, and there are also attached to this piece, a pawl, I, which engages in notches in the end piece D.

The pawl is prevented from falling back out of place, as the rake revolves, by a projection, J, which projects over it, and the wheels H are cleaned by the projections K.

There are rollers L on the inside of the draught-rods E, which roll against the end pieces D.

These rollers are used on account of the side-draught on the draught-rods.

The wheel-supporting pieces F are so connected to the draught-rods E as to be thrown back of the rake-head, as shown, so that the head will always assume the proper position for raking, but at the same time the wheel is allowed sufficient play, by the piece $a$ moving in the notch in the draught-rod, to allow the wheel to fall to nearly or quite a perpendicular position upon the spindle when the rake is revolved, but not to admit of its passing to the front of the rake-head.

The pawls I, engaging in the notches in the end pieces D, when the rake is in the raking-position, will admit of the rake-head revolving only in one direction.

The handle P is secured to the band Q, which passes loosely around an inner metallic band, R, that is firmly secured, by screws or otherwise, to the rake-head A.

There are four notches cut in the periphery of the inner band, two directly opposite each other, for the movable stop S, and two directly opposite each other, for the dog T.

The dog T is kept pressed down upon the periphery of the band R, by the spring U, and the movable stop by the spring V.

The rod Z is attached to the stop S, and also to the strap S', which passes through a slot in the hand-piece H', and is held therein by the key K'.

The operator, by turning the hand-piece H', draws back the stop S, and the rake-head revolves; but when it gets half way over, the stop catches into the other notch in the opposite side of the band R, and holds the rake-head in the proper position for raking another load.

The dog T is pressed against the band R by the spring U, and it so engages in notches therein, when the rake-head is in position for raking, that it will admit of the rake-head revolving so as to discharge the hay, but will not admit of its revolving the other way; and it also throws the front end of the teeth to the ground when the operator raises the handle.

The spring V causes the stop S to catch in its notches, the operator simply pulling it back, as above described, when he wishes to revolve the rake-head, and then immediately relinquishes it.

The length of the strap S' is regulated by slipping it through the slot in the handle-piece H'.

The draught-rods E are bent up at the end, as shown, so that they will not catch in the ground when thrown down, as they are liable to be.

The small wheels H, supporting the rake, prevent the friction occasioned by the rake sliding on the ground, and at the same time give the teeth the desired incline for raking.

The devices used in the attachment of the handle, enable the operator to have perfect control of the machine.

Having thus described the construction and operation of my invention,

What I claim, and desire to secure by Letters Patent, is—

1. The combination of the rake-head A and small wheels or rollers H, when so constructed and arranged that the wheels support the rake-head, but are raised from the ground, and carried over with the rake-head when the rake is revolved.

2. The combination of the rake-head A, spindles C, draught-rod E, and wheels H, when constructed and operating substantially as and for the purposes described.

3. The combination of the rake-head A, spindle C, and piece D, pawl I, wheel H, draught-arm E, and anti-friction wheel L, when constructed and arranged substantially as and for the purposes specified.

4. The combination of the handle H', with the rod Z and stop S, when so constructed and arranged, that by turning the said handle the stop is relieved, so as to allow the rake to revolve, substantially as described and shown.

DANIEL BULL.

Witnesses:
NORMAN H. RYAN,
J. R. SNYDER.